Dec. 9, 1941.   A. F. ROBERTSON   2,265,764
TOOL FOR CUTTING THREADS
Filed Aug. 2, 1940   4 Sheets-Sheet 1
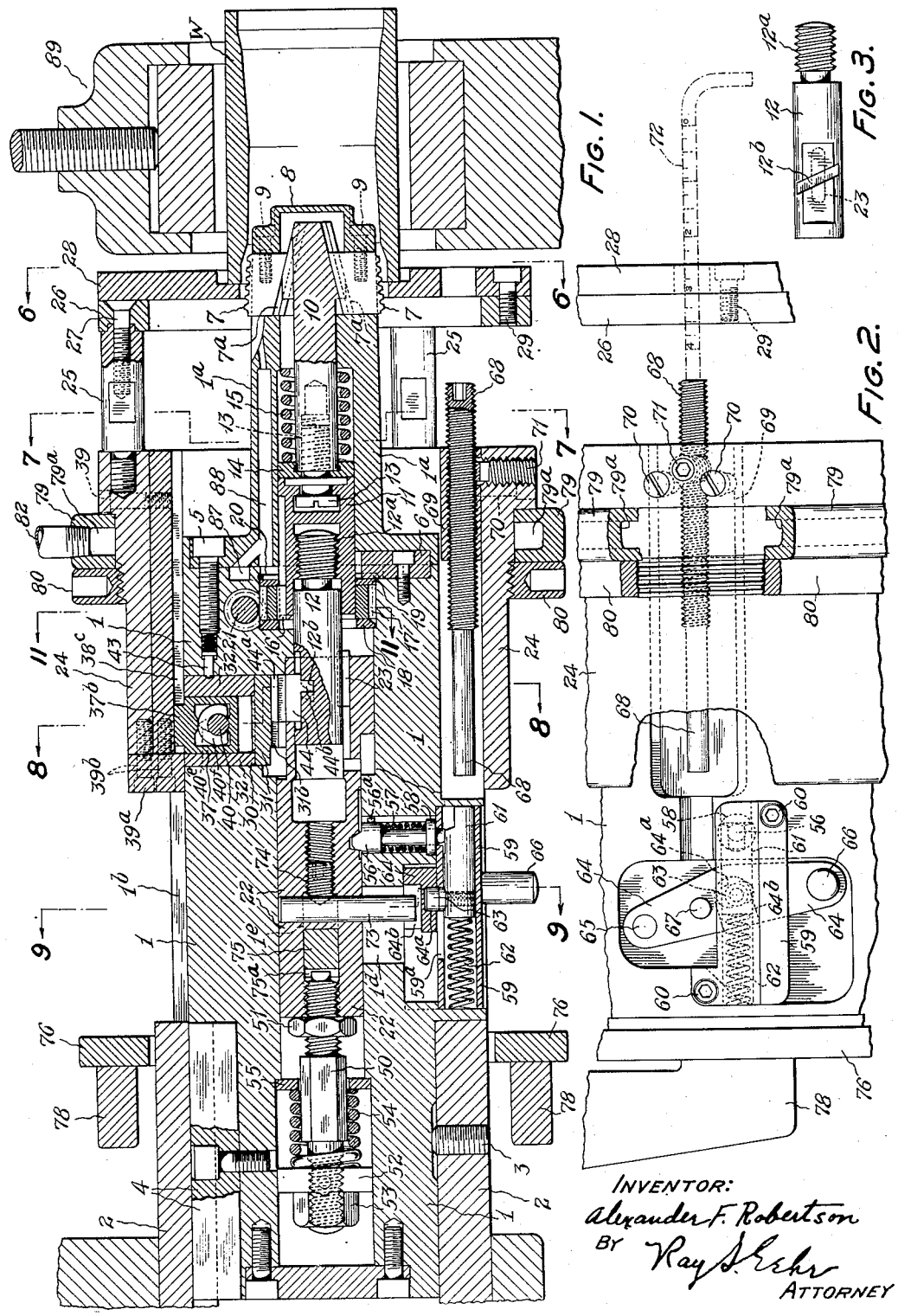
INVENTOR:
Alexander F. Robertson
BY Ray S. Eehr
ATTORNEY

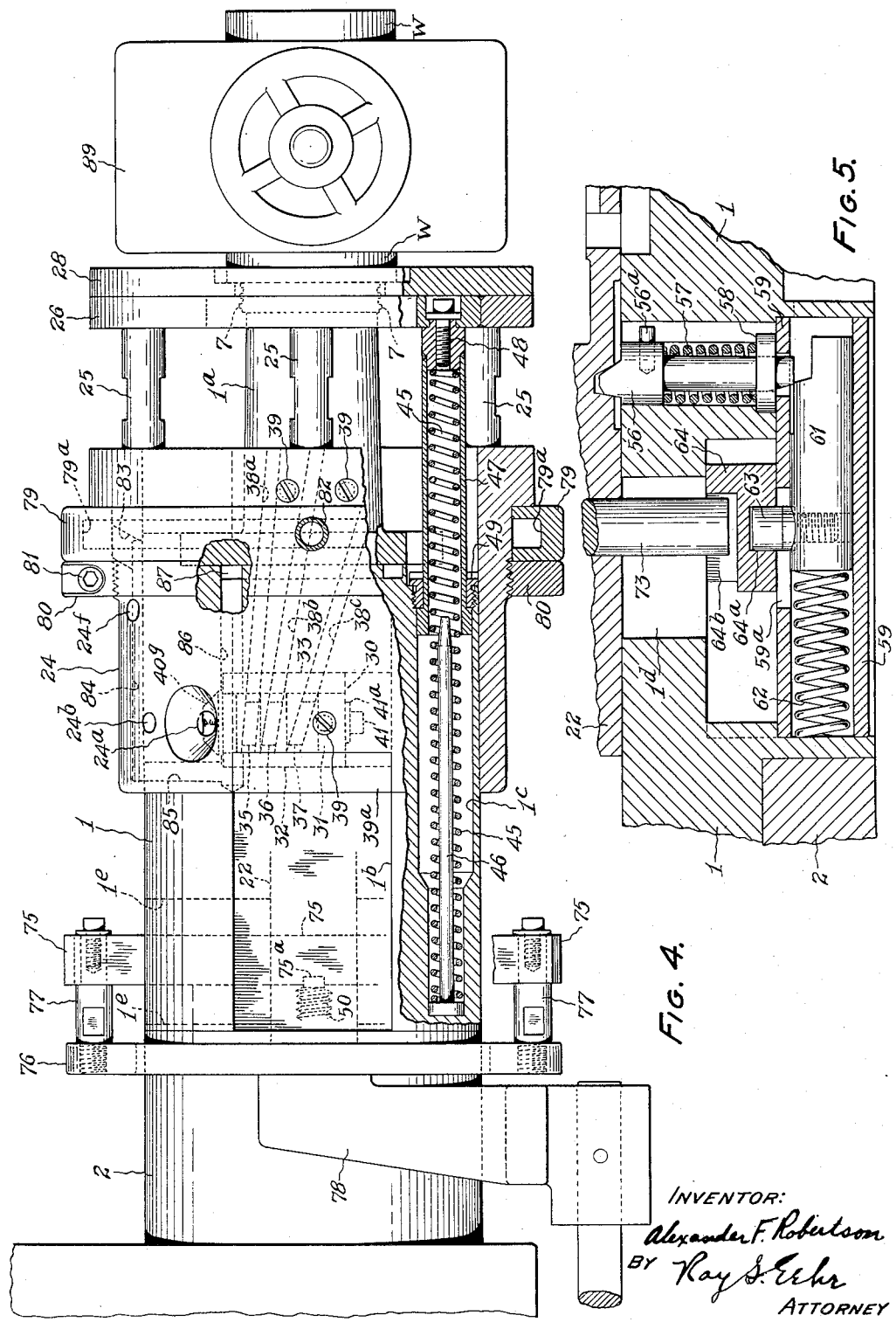

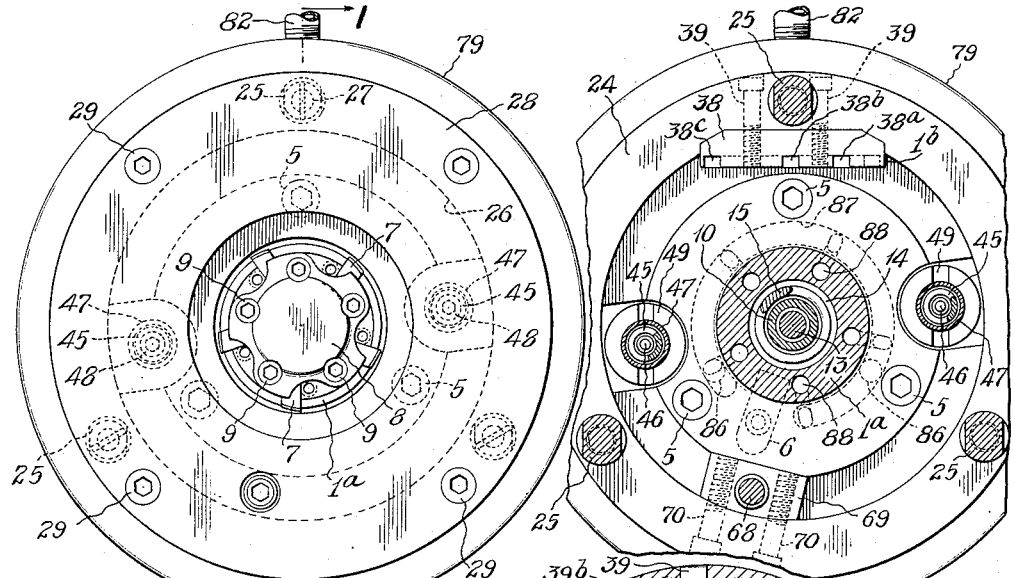
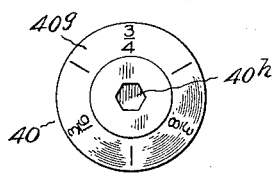
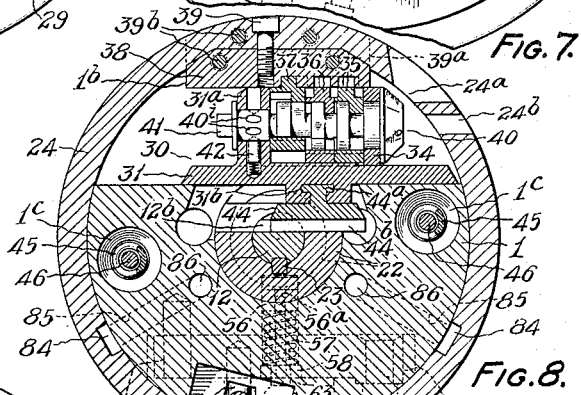
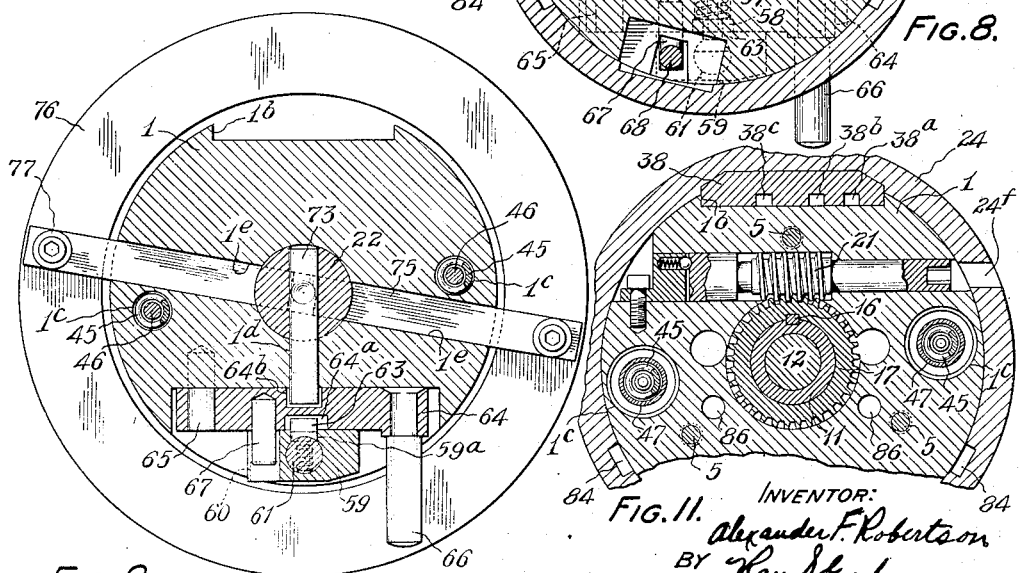

Dec. 9, 1941.                A. F. ROBERTSON                2,265,764
                           TOOL FOR CUTTING THREADS
                             Filed Aug. 2, 1940                4 Sheets-Sheet 4
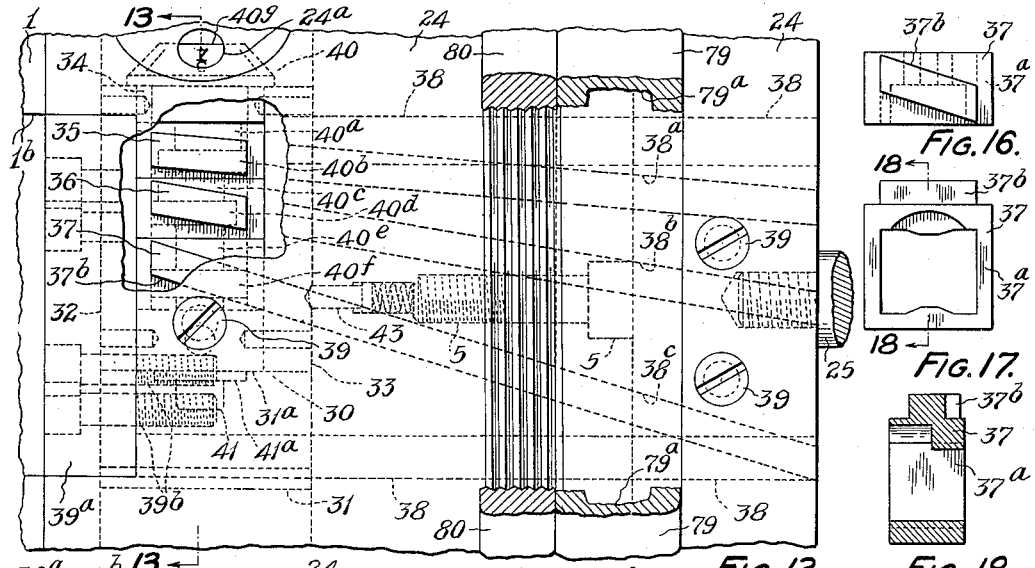
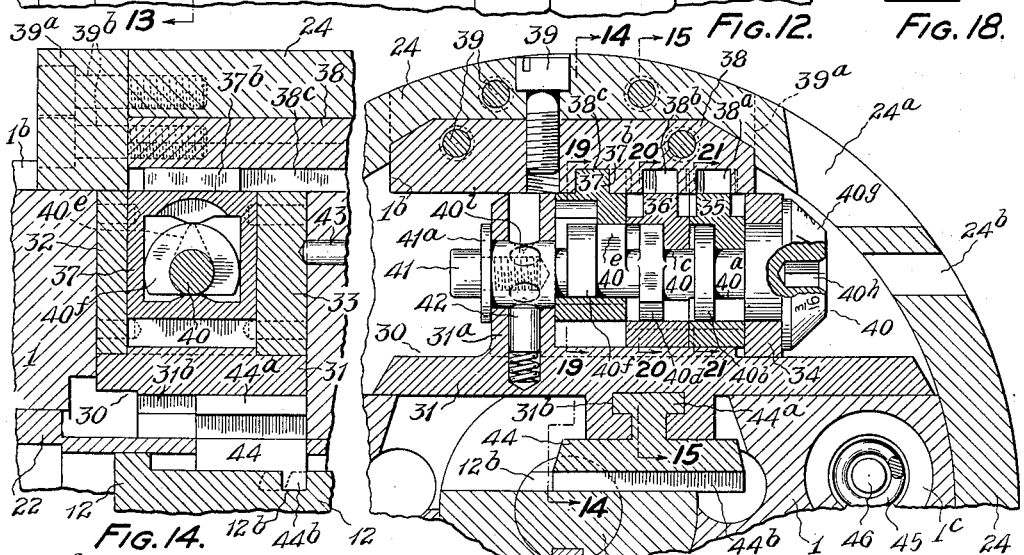
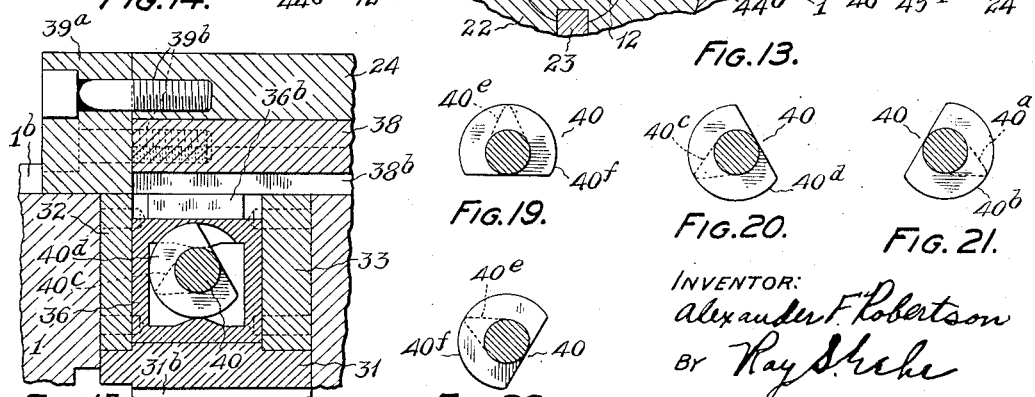

Patented Dec. 9, 1941

2,265,764

UNITED STATES PATENT OFFICE 2,265,764

TOOL FOR CUTTING THREADS

Alexander F. Robertson, South Euclid, Ohio, assignor to The Pipe Machinery Company, Cleveland, Ohio, a corporation of Ohio Application August 2, 1940, Serial No. 349,451

9 Claims. (Cl. 10—145)

This invention relates to thread-cutting tools of the type having one or more retractable cutters.

The invention has for one of its objects the provision, in a tool having receding cutters adapted to cut taper threads, of means for controlling the receding movement of the cutters comprising a plurality of alternatively operable retraction-controlling devices and actuating means adapted to move any one of said controlling means into operative position.

A further object of the invention is the provision of a thread-forming tool such as last referred to in which the retraction-controlling devices and the actuating means therefor are adapted, in at least one position of the actuating means, to prevent retraction of the cutter and thereby adapt the tool for the cutting of straight threads.

Another object of the invention is the provision of cutter-retracting means of the character referred to which are comparatively simple in construction, reliable in operation and susceptible of embodiment in a tool of compact and pleasing form.

A further object of the invention is the provision of a thread-cutting tool of the retractable cutter type having improved means for effecting the sudden retraction or collapse of the cutter at the end of the thread-cutting operation, the said improved means being normally operable by spring pressure but being characterized by the provision of means for applying force supplefental to that of the spring means to insure the collapsing movement under abnormal conditions.

A still further object of the invention is the provision of a tool having a collapsible cutter in which the collapsing movement is normally effected by spring pressure under automatic control and in which means is provided for manually controlling the collapsing movement and applying manual force supplementary to that of the spring for effecting the collapse.

Other objects more or less incidental or ancillary to those stated above will appear from the following description.

The invention consists in certain combinations and arrangements of parts as hereinafter explained in connection with the accompanying drawings and more particularly pointed out in the appended claims.

In the drawings,

Fig. 1 is a vertical axial section through a tap which embodies my improvements in a preferred form of construction.

Fig. 2 is a fragmentary bottom view of parts of the tool shown in Fig. 1 with portions of the structure broken away and shown in section.

Fig. 3 is a detached plan view of one of the parts of the inner slide structure of the tool.

Fig. 4 is a plan view of the tool as shown in Fig. 1 with some of the parts broken away to better show details of construction.

Fig. 5 is an enlarged fragmentary section of part of the devices for controlling the collapse of the cutters, the section being taken on the same plane as is Fig. 1 but showing the parts in the relative positions which they occupy when the collapse of the cutters is about to occur at the end of the thread-forming operation.

Fig. 6 is a front end elevation of the tool with the omission of the work and work holder shown in Fig. 1.

Fig. 7 is a transverse section on the broken line 7—7 of Fig. 1.

Fig. 8 is a transverse section on the broken line 8—8 of Fig. 1.

Fig. 9 is a transverse section on the broken line 9—9 of Fig. 1.

Fig. 10 is an elevation of one of the parts of the mechanism shown detached.

Fig. 11 is a fragmentary sectional view on the line 11—11 of Fig. 1.

Fig. 12 is an enlarged fragmentary plan view of a portion of the tool with some of the parts broken away and sectioned.

Fig. 13 is a transverse section on the line 13—13 of Fig. 12.

Fig. 14 is a section on the broken line 14—14 of Fig. 13.

Fig. 15 is a section on the line 15—15 of Fig. 13.

Figs. 16 and 17 are, respectively, a plan and side elevation of one of the cam followers shown detached.

Fig. 18 is a section on the line 18—18 of Fig. 17.

Figs. 19, 20 and 21 are sectional views of the cam follower actuator taken on the lines 19—19, 20—20 and 21—21, respectively, of Fig. 13.

Fig. 22 is a sectional view of the cam follower actuator taken on the line 19—19 with the actuator rotated through sixty degrees from its position in Fig. 19.

Referring in detail to the construction illustrated, I designates the tool body which is generally cylindrical in form and is shown mounted in the tubular live spindle 2 of a motor driven machine suitable for the rotation and axial advancing and retracting of the tool body. A set screw 3 secures the tool body against endwise displacement in the spindle and a key 4 effects driving connection between the two parts. The tool body is provided with a separable head or nose 1ª secured to the front end of the body by cap screws 5 and a key 6. The front end of the head section 1ª of the tool body is slotted in well known manner to receive a plurality of cutters or chasers 7 which are held against displacement in an axial direction by a cap 8 secured by cap screws 9 to head 1ª (Figs. 1 and 5). The expanding and retracting movements of the cutters 7 are effected or controlled by an inner slide structure comprising members 10, 11 and 12, the members 10 and 11 being axially disposed and slidably mounted in the head 1ª and the member 10 having the usual cone at its front end with inclined cam tongues disposed to engage cam grooves 7ª of the cutters. A swivel connection between the slide members 10 and 11 is effected by means of a screw 13. The head of the screw engages a slot in the end of member 11 and an integral collar on the screw serves to clamp the separate collar 14 between the screw and the end of member 10, thus forming an abutment for the rear end of helical spring 15 which has its front end abutting against a shoulder on the head 1ª. The member 11 is held against rotation in the head 1 by a spline 16.

A worm wheel 17 is non-rotatably secured on the rear end of member 11, the wheel 17 being interposed between bearing rings 18 and 19 and the assembled parts 17, 18 and 19 being secured in position in tool body 1 by a snap ring 20. A worm 21 rotatably mounted in body 1 engages the worm wheel 17 and by rotation of the worm the member 11 can be rotated, such rotation effecting axial movement of members 10 and 11 because the latter is internally threaded to engage the threaded end 12ª of the member 12 which is normally held against axial movement.

Member 12 has its rear end slidably supported in an abutment member 22 which in turn is axially arranged and slidably supported in tool body 1. The abutment member 22, however, is designed to be secured against movement in the tool body by disengageable holding means which will later be explained. The slide member 12 is prevented from rotating in relation to abutment member 22 by a spline 23.

A work-engaging slide structure is operatively mounted upon the outer surface of tool body 1 and comprises a tubular member 24 which fits the outer surface of body 1 for movement thereon in an axial direction. Three threaded spacer posts 25, 25 are attached to the front side of slide member 24 and at their front ends carry a ring 26 secured by screws 27 and this ring in turn carries a work-engaging ring 28 which is secured to ring 26 by cap screws 29.

In the operation of the tool the outer slide structure, comprising the parts 24 to 29, engages the work to be threaded so that as the tool body is advanced toward the work the outer slide structure has a rearward movement in relation to the tool body. This relative movement is utilized to effect a corresponding movement of the inner slide structure relative to the tool body and thus control the receding movement of the cutters to cut a thread in taper form. To this end novel operative connections are provided between the outer and inner slide structures as follows.

Between the outer and inner slides is arranged a transversely movable slide designated as an entirety by 30 and comprising a main base member 31 having an integral upstanding wall 31ª which, together with separate side walls 32 and 33 and end wall 34 which are pinned together and to the member 31 as indicated in Figs. 8, 12 and 14, form an open-sided chamber in which are mounted a series of three cam followers 35, 36 and 37 which are shown in Figs. 12 and 13 and one of which is shown detached in Figs. 16 to 18. As shown in the latter figures, the follower 37 comprises a frame-like portion 37ª and a cam-follower tongue 37ᵇ projecting from the upper side of the frame portion. Each of the other followers 35 and 36 are of the same character though differing in dimensions and inclination of the tongue part of the structure.

Above the transverse slide 30 is arranged a cam plate 38 which is secured to the inner side of the slide member 24 by a series of screws 39 and by a tie block 39ª which is secured to the rear edges of slide 24 and cam 38 by screws 39ᵇ. The cam block slidably engages a depression 1ᵇ in the outer surface of tool body 1 and thus prevents relative rotation of slide 24 and tool body 1. On its under side the cam plate 38 is formed with three cam grooves 38ª, 38ᵇ and 38ᶜ which are differently inclined to a vertical plane through the axis of the tool and which are adapted to be engaged by the tongue portions of the followers 35, 36 and 37, respectively. Any one of the followers can be moved upward into operative engagement with the cam plate so that axial movement of the outer slide in relation to the tool body will effect more or less movement of the transverse slide 30 according to which of the grooves of cam plate 38 is operatively connected to the slide 30.

To make it possible to easily effect operative connection of any one of the cam followers 35, 36 and 37 with cam plate 38, the slide 30 is provided with an actuator 40 which is rotatably mounted in the end walls 31ª and 34 of the slide. The actuator has a pair of cams 40ª and 40ᵇ to cooperate with the follower 35, a similar pair of cams 40ᶜ and 40ᵈ to cooperate with follower 36 and a similar pair of cams 40ᵉ and 40ᶠ to cooperate with follower 37. At one end the actuator 40 is formed with a head 40ᵍ which engages end wall 34 and at its other end is fitted with a securing screw 41 and washer 41ª which latter engages the wall 31ª. On its conical surface the actuator head 40ᵍ is provided with a series of markings "$\frac{3}{16}$," "$\frac{3}{8}$" and "$\frac{3}{4}$" indicating thread tapers and a series of straight lines indicating straight threads (Fig. 10), and the slide member 24 is provided with an opening or window 24ª through which the markings on head 40ᵍ may be viewed when the slide 24 is in the position indicated in Fig. 1. The actuator head is also provided with a central angular socket 40ʰ to receive an actuating wrench or tool which may be inserted through an aperture 24ᵇ in slide member 24.

From a comparison of Figs. 12, 13 and 14 it will be seen that the cam parts 40ª, 40ᶜ and 40ᵉ of the actuator 40 serve to lift their respective followers 35, 36 and 37 while the cam parts 40ᵇ, 40ᵈ and 40ᶠ serve to lower their respective followers. It will also be observed from Figs. 19, 20 and 21 that the three pairs of cams are spaced 120° apart in relation to each other so that when one of the cam followers is raised, as for example the follower 37 as shown in Fig. 13, the other followers 35 and 36 are lowered. By turning the actuator 40 120° in one direction from the position shown in Figs. 13 and 14 the follower 37 will be lowered and the follower 35 raised to operative position while by turning the actuator 120° in the opposite direction the follower 37 will be lowered and the follower 36 raised to operative position in engagement with cam 38. It will also be seen that by turning the actuator 40 60° in either direction from a position in which one of the followers is raised to operative position (as shown, for example, in Fig. 22) such follower will be lowered to inoperative position but neither of the other followers will be raised to operative position so that axial movement of the outer slide will then effect no transverse movement of the slide 30. To assist in centering and holding the actuator 40 in any one of its various operative positions, it is provided with a circumferential series of depressions or sockets 40$^1$ which cooperate with the spring-pressed plunger 42 carried by the slide 30.

To yieldingly hold the transverse slide 30 in the position which it occupies at the beginning of the thread-cutting operation, as shown in the various figures of the drawings, the front side of the said transverse slide is formed with a depression or socket to cooperate with the spring-pressed plunger 43 (Figs. 1, 12 and 14).

To transmit the movement of the transverse slide 30 to the inner slide structure, said slide 30 is slidably connected to a cam member 44 which has a tongue 44$^a$ T-shaped in cross section slidably engaging a similarly shaped channel 31$^b$ in the bottom of slide member 31. On its lower side the cam member 44 is formed with a cam tongue 44$^b$ which is inclined to a vertical plane at right angles to the axis of the tool and engages a similarly inclined groove or slot 12$^b$ in the inner slide member 12 (see Figs. 1, 3, 8 and 13). The cam 44 is arranged to slide transversely in a transverse guide slot in the top of the abutment 22 (Figs. 1 and 14) so that transverse movement of cam 44 with the transverse slide 30 will effect axial movement of the inner slide structure comprising the parts 10, 11 and 12 and thus determine inward or outward movement of the cutters 7. From a consideration of the inclination of the cam grooves in the cam plate 38 and in the inner slide member 12 it will be seen that forward movement of the tool body 1 relative to the work-engaging slide 24 will cause a rearward movement of the inner slide structure in relation to the tool body 1. Such rearward movement of the inner slide structure is assisted by the coil spring 15, the movement, however, being positively controlled by the cam devices so that, if the cutters 7 or other connected parts should stick or bind, the accurate retraction of the cutters is insured.

A pair of long helical springs 45 arranged at diametrically opposite points (see Figs. 4 and 6 to 11) are interposed between the tool body and the ring 26 of the outer slide for the purpose of returning the outer slide to its forward position on the tool body 1 when the latter is withdrawn from the work following the thread-cutting operation. To accommodate springs of such length as the springs 45, holes 1$^c$ are drilled in the tool body 1 and to prevent buckling of the springs each is provided with a headed guide rod 46 which is pressed into hole 1$^c$ and also with a guide tube 47 which is attached by means of screw 48 to the guide ring 26 and slidably engages the wall of hole 1$^c$. The rear end of tube 47 is enlarged to form an outwardly-extending shoulder adapted to engage the threaded ring 49 secured in the mouth of hole 1$^c$, and the tubes 47 thus serve to limit the forward movement of the outer slide on the tool body under the expanding force of the springs.

The abutment 22 is provided with a rearward extension in the form of a rod 50 which is threaded at its front end to engage a threaded hole in the rear end of abutment 22 in which it is adjustably secured by the lock nut 51. The rear end of the rod 50 carries a collar 52 which is secured by a nut 53 on the threaded rear end of the rod. A helical spring 54 surrounds the rod with its rear end abutting against the collar 52 and its front end against a collar 55 which in turn abuts against a shoulder in the bore of the tool body. Thus the spring 54 tends constantly to urge the abutment 22 rearward in the bore of the tool body.

The abutment 22 is normally secured against movement by spring 54 by a holding device or latch 56 which is slidably mounted in a radial hole in the tool body 1 and engages a notch in the abutment 22. The holding means 56 is secured against rotation by a lug 56$^a$ which slidably engages a groove in the tool body 1, as shown in Figs. 1 and 5. The latch 56 is pressed into engagement with the abutment 22 by a relatively light helical spring 57 which surrounds the stem of the latch and abuts against a collar 58 which is secured in position by a block 59 that is in turn secured by screws 60, 60 to the tool body 1.

It will be observed that the latch 56 and the notch of the abutment 22 at their front sides are inclined to the axis of the tool so that the pressure of the large spring 54 tends to move the latch 56 outward against the tension of the light spring 57 to a disengaged position. Such movement of the latch 56 is prevented by a detent bolt 61 which is slidably mounted in a hole drilled in the block 59. Bolt 61 is normally pressed forward by a helical spring 62 as far as is permitted by the head of a screw 63 which is carried by bolt 61 and projects through a slot 59$^a$ in the block 59. With the bolt 61 in its forward position it overlies the end of latch 56 so that the latter cannot be disengaged, but when the bolt 61 is moved rearward it releases the latch 56 to permit its disengagement.

The tool body 1 is recessed adjacent the block 59 to accommodate a hand lever 64 which is pivotally connected at one end to the tool body by a pin 65 and at its other end is fitted with a handle 66. On its outer side the lever 64 is formed intermediate its ends with a slightly elongated recess 64$^a$ which embraces the head of screw 63 carried by the detent bolt 61. The lever also carries a pin 67 which projects from its outer side at a point adjacent the recess 64$^a$. In line with this pin 67 an elongated rod 68 is adjustably mounted on the outer slide structure, the rod 68 being threaded in a block 69 which is secured by screw 70, 70 to the front end of outer slide member 24, and being secured in adjusted position by a set screw 71. The front end of rod 68 is formed with an angular socket to receive a wrench 72 which is graduated as shown in Fig. 2 and which can be inserted into engagement with rod 68 through an aperture formed in the work-engaging ring 28. With this arrangement of parts, when the tool body moves forward in relation to the outer slide the pin 67 of the lever 64 engages the rod 68 whereupon further movement of the tool body causes a rearward swinging of lever 64 and a retraction of the detent bolt 61, thus freeing the holding latch 56 so that it can be forced to inoperative position and release the abutment 22 for rearward movement in the tool body under the pressure of spring 54.

The lever 64 is provided on its inner side with an open-ended slot 64ᵇ which loosely embraces the outer end of a pin 73 which is secured to the abutment 22 by a set screw 74 and which extends through a slot 1ᵈ in the tool body 1 to enter the slot 64ᵇ in the lever, thus forming an operative connection between the lever and the abutment 22 for a purpose which will later be explained.

To provide for the setting of the tool with its parts in position for the starting of a thread-forming operation, as shown in Fig. 1 of the drawings, a transverse bar 75 is mounted in a transverse aperture in the abutment 22 with the ends of the bar extending radially outward through a slot 1ᵉ in the tool body, the bar being secured against endwise displacement by a slot 75ᵃ which embraces the end of the rod 50. A setting ring 76 is supported by the bar 75, being secured to the ends of the bar by a pair of posts 77, as shown in Fig. 4. The machine on which the tool is mounted may comprise a normally fixed yoke 78, the arms of which embrace the live spindle of the machine in a position to be engaged by the ring 76 when the tool is retracted.

The tool has means for conducting fluid to the cutters comprising a ring 79 which is formed on its inner side with a channel 79ᵃ and which fits the outer periphery of the outer slide member 24, being held against movement in an axial direction by a shoulder on the front end of member 24 and by an adjustable ring 80 which is threaded on slide member 24, the ring being split and provided with a locking screw 81. A fluid supply pipe 82 is threaded into the ring 79 and serves to secure the latter against rotation with the tool. Cutting fluid admitted to channel 79ᵃ is conducted through passages 83 (Fig. 4) and channels 84 in slide member 24 to radial passages 85 and thence through longitudinal passages 86 to a circumferential recess 87 in the tool body 1. From recess 87 the fluid is led forward through a plurality of passages 88 (Fig. 1) for discharge against the cutters 7.

The machine on which the tool is mounted will include a suitable clamp or work-holding means which is designated as an entirety by 89 and is adapted to hold the work to be threaded such as the pipe coupling W shown in Fig. 1.

In the use of the tool, if taper threads are to be formed the tool is first adjusted to provide for the specific taper, length and diameter of the thread to be cut. Adjustment for the taper desired is effected very easily and quickly by applying a wrench to the socket 40ᵍ of the actuator 40 and turning the actuator until the indicator mark of the desired taper is brought opposite the window or aperture 24ᵃ so as to project the proper cam follower into operative engagement with the cam 38. The mechanism illustrated has three different tapers which will thus provide for those most used, but it will be understood that if other special tapers are desired this can be provided for by the substitution for the cam plate 38 of a similar plate with suitably varied cam grooves and the corresponding substitution for the followers 35, 36 and 37 of others with tongues of suitable inclination to cooperate with the modified cam grooves of the substituted cam plate.

The taper of the thread having thus been determined, the diameter of the thread may be fixed by rotation of the worm 21 to effect a forward or rearward adjustment of the inner slide members 10 and 11, such rotation of the worm being effected by inserting a suitable wrench or tool through an aperture 24ᶠ in the slide member 24 to engage the end of the worm.

Finally, the adjustment for the length of the thread to be cut is effected by adjusting the threaded rod 68, this adjustment being made by the use of the wrench 72, the graduation of which in connection with the face of the front plate 28 serving to indicate the desired position of the rod 68.

In the operation of the adjusted tool, assuming that the working parts thereof are in the positions shown in Fig. 1 with the cutters 7 in their expanded positions and both the inner slide structure and the outer slide structure in their forward positions on the tool body and with the abutment 22 latched in its forward position in the tool, upon the rotation and forward feeding of the machine spindle and the tool the work-engaging ring 28 is brought into engagement with the rear end of the coupling W, whereupon the forward movement of the outer slide structure of the tool is stopped by the work and the continued forward feeding of the tool results in the advance of the tool body 1 in relation to the outer slide structure. This movement causes the cam plate 38, through engagement with the cam follower 37 (or 36 or 35) on the transverse slide 30, to move the latter slide thereby causing the cam 44 carried by the transverse slide to move transversely in relation to the inner slide member 12 with which it has cam connection and thereby permit or cause a positive rearward movement of the inner slide structure comprising the parts 10, 11 and 12 and thereby in turn effect a corresponding gradual receding movement of the cutters 7 with a resultant taper of the thread formed by the cutters.

As the end of the thread-cutting operation is approached, the pin 67 of the lever 64 engages the end of the rod 68 whereupon further axial advance of the tool body effects rearward movement of the detent bolt 31 in relation to the latch 56 until the parts reach the relative positions shown in Fig. 5 where bolt 61 is about to be disengaged from the end of holding latch 56 and upon such disengagement the cam action of the spring-pressed abutment 22 forces the holding latch 56 outward so that the abutment is permitted to move rapidly rearward under the pressure of spring 54 to effect a correspondingly rapid collapse of the cutters 7. This movement is permitted by the previously described sliding connection between the cam 44 and the transverse slide 30. If when the detent 61 is disengaged from the holding latch 56 the latter, because of the entry of dirt or foreign matter or for other reason, should not be disengaged from the abutment 22 by the pressure of spring 54, the lost motion connection between the lever 64 and the pin 73 of the abutment 22 will apply positive pressure to the abutment to supplement the pressure of spring 54 and thus insure disengagement of the latch 56 and the rearward movement of the abutment and the positive collapse of the cutters 7.

Upon the collapse of the cutters the feed of the machine is reversed and the tool body retracted relative to the work. During this movement the springs 45, which had been compressed during the thread-cutting operation, expand and keep the work-engaging ring 28 in engagement with the work until the rings 49 engage the shoulders of tube 47 whereupon any further retraction of the tool body draws the work-engaging ring away from the work. The retracting movement of the tool brings the setting ring 76 into engagement with the stationary yoke 78 and this causes bar 75 to move the abutment 22 forward relatively to the body 1, until its notch is opposite the holding latch 56 whereupon the latter moves into locking engagement and the spring 62 forces the bolt 31 forward to secure the latch 56 in position. The forward movement of the abutment 22 carries with it the inner slide structure comprising the parts 10, 11 and 12, this being permitted because the slidable connection of cam 44 with the transverse slide 30 allows the said cam to move freely forward with the abutment and inner slide structure.

If, at any time during the operation of the tool, because of entry of dirt or any foreign substance, the cutters or other associated parts of the mechanism should bind so as to prevent proper free movement of the parts, the latter can be freed by manual operation of the lever 64. That is to say, by swinging this lever rearward the latch 56 can be disengaged to permit the springs 15 and 54 to urge the inner slide structure rearward so as to collapse the cutters; and if the binding of the parts should be sufficiently severe to prevent the pressure of the springs to free the parts a sharp movement of the lever 64 against the pin 73 carried by the abutment 22 will serve, by applying a sudden shock or jar to the parts of the tool, to effectively free them.

It will be observed, in connection with the disengageable holding latch mechanism for the abutment 22, that during the release of the latch there is only a light pressure between the parts having relative movement and hence wear of such parts is minimized. Thus the pressure between the outer end of the stem of latch 56 and the detent bolt 61 is relatively slight because of the inclination of the cam face on the inner end of the latch; and after the bolt 61 has been disengaged from the end of the latch 56 and movement between the cam surfaces of the latch and of the abutment 22 occur, the pressure between these cam surfaces is only the slight pressure caused by the light spring 57 of the latch. Because of the small wear of the engaging parts of the latch mechanism the thread cut by the tool has a high degree of accuracy not only throughout the major part of its length but also throughout the small portion of the thread which is cut during the disengagement of the latch parts.

The advantages of the taper-varying mechanism will readily be apparent, since the advantage of effecting a change from one taper to another or to the cutting of a straight thread, by a mere adjustment of one of the parts of the mechanism, is quite obvious in comparison with prior practice in which it was customary to remove a part of the mechanism of the tool and substitute a modified part, or to loosen and adjust parts, in order to secure the desired change in taper. It will be observed, too, that any one of the adjustments of the tool, whether for taper, diameter or length of thread, can be effected without disturbing any of the other adjustments.

It is pointed out also that the chordal arrangement of the intermediate slide 30 facilitates the attainment of a compact design of pleasing appearance.

While, for purposes of explanation and illustration, I have shown my improvements embodied in a tap adapted to cut taper threads, the improvements are applicable to other forms of tap or die tools, without departing from the scope of the invention indicated in the appended claims.

What I claim is:

1. In a tool for forming taper threads, the combination of a tool body; means, comprising a cutter movably mounted on the tool body, for cutting a thread when the tool body and the work to be threaded are given relative rotational and axial movements; a slide operatively mounted for movement on the tool body in the direction of the tool body axis, said slide being adapted to engage the work and be held against axial movement relative to the work during the thread-cutting operation; and means for transmitting relative axial movement of the slide and tool body to the cutter to control retraction thereof during the thread-cutting operation, said means comprising cooperating driving and driven cam devices one of which has a plurality of differently inclined cam surfaces corresponding to different thread tapers and the other of which has a plurality of cam members each of which is adapted to move into and out of operative engagement with one of the cam surfaces of the other device and an actuator for the cam members adapted to move any one of said members into operative engagement with its cooperative cam surfaces on the other said cam device.

2. A tool as claimed in claim 1 comprising means associated with the cam member actuator for visually indicating the specific taper of the thread which the tool is adapted to cut for each of the plurality of possible settings of the actuator.

3. A tool as claimed in claim 1 in which the cam member actuator is adapted in at least one position thereof to hold all of the said cam members disengaged from their respective cooperating cam surfaces, whereby relative axial movement of the slide and tool body is not transmitted to the cutter and the tool is adapted to cut a straight thread.

4. In a tap for forming taper threads, the combination of a tool body; means, comprising a cutter movably mounted on the tool body, for cutting a thread when the tool body and work to be threaded are given relative rotational and axial movements; an outer work-engaging slide operatively mounted for movement on the tool body in the direction of the tool body axis; and means for transmitting relative axial movement of the outer slide and the tool body to the cutter to effect retraction thereof during the thread-cutting operation, said means comprising an inner slide structure mounted in the tool body for axial movement in relation thereto and operatively connected to the cutter, a transverse slide structure operatively mounted for movement in the tool body transversely thereof, cam connections between the outer slide and the transverse slide, and cam connections between the transverse slide and the inner slide, the said cam connections between the outer slide and the transverse slide comprising a plurality of differently inclined cam surfaces fixedly carried by the outer slide and corresponding to different thread tapers, a plurality of cam members each of which is operatively mounted on the transverse slide for movement into and out of operative contact with one of the cam surfaces carried by the outer slide and a rotary actuator carried by the transverse slide and adapted to move any one of the cam members into operative engagement with one of the cam surfaces of the outer slide.

5. In a tap for forming taper threads, the combination of a tool body; means, comprising a cutter movably mounted on the tool body, for cutting a thread when the tool body and work to be threaded are given relative rotational and axial movements; an outer work-engaging slide operatively mounted for movement on the tool body in the direction of the tool body axis; and means for transmitting relative axial movement of the outer slide and the tool body to the cutter to effect retraction thereof during the thread-cutting operation, said means comprising an inner slide structure mounted in the tool body for axial movement in relation thereto and operatively connected to the cutter, a transverse slide structure operatively mounted for movement in the tool body transversely thereof, cam connections between the outer slide and the transverse slide, and cam connections between the transverse slide and the inner slide, the said cam connections between the outer slide and the transverse slide comprising a plurality of differently inclined cam surfaces fixedly carried by the outer slide and corresponding to different thread tapers, a plurality of cam members each of which is operatively mounted on the transverse slide for movement into and out of operative contact with one of the cam surfaces carried by the outer slide and a rotary actuator carried by the transverse slide and adapted to move any one of the cam members into operative engagement with one of the cam surfaces of the outer slide and in at least one position to hold all of the said cam members disengaged from the cam surfaces of the outer slide.

6. In a tap for forming taper threads, the combination of a tool body; means, comprising a cutter movably mounted on the tool body, for cutting a thread when the tool body and work to be threaded are given relative rotational and axial movements; an outer work-engaging slide operatively mounted for movement on the tool body in the direction of the tool body axis; and means for transmitting relative axial movement of the outer slide and the tool body to the cutter to effect retraction thereof during the thread-cutting operation, said means comprising an inner slide structure mounted in the tool body for axial movement in relation thereto and operatively connected to the cutter, a transverse slide structure operatively mounted for movement in the tool body transversely thereof, cam connections between the outer slide and the transverse slide, and cam connections between the transverse slide and the inner slide, the said cam connections between the outer slide and the transverse slide comprising a plurality of differently inclined cam surfaces fixedly carried by the outer slide and corresponding to different thread tapers, a plurality of cam members each of which is operatively mounted on the transverse slide for movement into and out of operative contact with one of the cam surfaces carried by the outer slide and a rotary actuator carried by the transverse slide and adapted to move any one of the cam members into operative engagement with one of the cam surfaces of the outer slide and in at least one position to hold all of the said cam members disengaged from the cam surfaces of the outer slide, and in which means is provided for holding the transverse slide against transverse movement, whereby the tap is adapted to cut straight threads as well as taper threads.

7. In thread-cutting apparatus, the combination of a tool body having in operation axial and rotational movement relative to the work to be threaded; a thread-forming cutter movably mounted on the body to permit retraction of the cutter at the end of the thread-forming operation; means movably supported by the tool body and serving when rapidly moved to rapidly retract the cutter; pressure means acting on the said movably supported means and tending by pressure thereon to effect rapid movement thereof and corresponding rapid retraction of the cutter; holding means interposed between the tool body and the movably supported means for holding the latter from the said rapid movement, said holding means comprising a member movable from an operative to an inoperative position by the force of the said pressure means and movably mounted detent means acting in one position to oppose and prevent movement of the said holding member by the pressure means; and means acting at the end of the thread-forming operation to move the detent means to inoperative position and thereafter to apply pressure to the retracting means supplementary to that of the said pressure means acting thereon.

8. In thread-cutting apparatus, the combination of a tool body having in operation axial and rotational movement relative to the work to be threaded; a thread-forming cutter movably mounted on the body to permit retraction of the cutter at the end of the thread-forming operation; means movably supported by the tool body and serving when rapidly moved to rapidly retract the cutter; pressure means acting on the said movably supported means and tending by pressure thereon to effect rapid movement thereof and corresponding rapid retraction of the cutter; holding means interposed between the tool body and the movably supported means for holding the latter from the said rapid movement, said holding means comprising a member movable from an operative to an inoperative position by the force of the said pressure means and movably mounted detent means acting in one position to oppose and prevent movement of the said holding member by the pressure means; means acting at the end of the thread-forming operation to move the detent means to inoperative position; and a lost motion connection between the detent means and the movably supported means adapted to apply pressure to the movably supported means supplementary to that of the pressure means acting thereon after the detent means has been moved to inoperative position.

9. In thread-cutting apparatus, the combination of a tool body having in operation axial and rotational movement relative to the work to be threaded; a thread-forming cutter movably mounted on the body to permit retraction of the cutter at the end of the thread-forming operation; means movably supported by the tool body and serving when rapidly moved to rapidly retract the cutter; pressure means acting on the movably supported means and tending by pressure thereon to effect rapid movement thereof and corresponding rapid retraction of the cutter; holding means interposed between the tool body and the movably supported means for holding the latter from the said rapid movement, said holding means comprising a member movable from an operative to an inoperative position by the force of the said pressure means and movably mounted detent means acting in one position to oppose and prevent movement of the said holding member by the pressure means; means acting at the end of the thread-forming operation to move the detent means to inoperative position and thereby permitting movement of the holding member to inoperative position; and manually movable means adapted successively to move the detent means to inoperative position and to apply pressure to the said movably supported means supplementary to that of the pressure means acting thereon.

ALEXANDER F. ROBERTSON.